United States Patent [19]

Nozaki et al.

[11] Patent Number: 5,229,470
[45] Date of Patent: Jul. 20, 1993

[54] RESIN COMPOSITION FOR MATTE POWDER COATING

[75] Inventors: Tokuzo Nozaki; Katsuyoshi Atsumi; Makiko Sakai, all of Aichi, Japan

[73] Assignee: Nippon Ester Co., Ltd., Aichi, Japan

[21] Appl. No.: 670,097

[22] Filed: Mar. 15, 1991

[51] Int. Cl.⁵ .................. C08L 67/02; C09D 5/03; C09D 5/46
[52] U.S. Cl. .................... 525/440; 525/934; 528/45
[58] Field of Search .................. 525/440, 934; 528/45

[56] References Cited

U.S. PATENT DOCUMENTS

| | | | |
|---|---|---|---|
| 4,087,479 | 5/1978 | Toyota et al. | 525/438 |
| 4,242,253 | 12/1980 | Yallourakis | 525/934 |

FOREIGN PATENT DOCUMENTS

| | | |
|---|---|---|
| 005022 | 10/1979 | European Pat. Off. . |
| 0139830 | 5/1985 | European Pat. Off. . |
| 0408465 | 1/1991 | European Pat. Off. . |
| 61-19668 | 5/1986 | Japan . |
| 64-1770 | 1/1989 | Japan . |
| 8905320 | 6/1989 | PCT Int'l Appl. . |

Primary Examiner—James J. Seidleck
Assistant Examiner—Thomas Hamilton, III
Attorney, Agent, or Firm—Sughrue, Mion, Zinn, Macpeak & Seas

[57] ABSTRACT

A resin composition for a matte powder coating comprising a polyester A having a hydroxyl value of at least 1,200 g eq/$10^6$ g, a polyester B having a hydroxyl value of from 200 to 1,000 g eq/$10^6$ g and a blocked isocyanate hardener, wherein the weight ratio of polyester A to polyester B is from 70:30 to 10:90, the difference (absolute value) in gel time between polyester A and polyester B is at least 3 minutes and the difference (absolute value) in acid value between these polyesters is at least 20 g eq/$10^6$ g is disclosed.

6 Claims, No Drawings

RESIN COMPOSITION FOR MATTE POWDER COATING

FIELD OF THE INVENTION

The present invention relates to a resin composition for a matte powder coating capable of giving a matte (including semimatte) coating film.

BACKGROUND OF THE INVENTION

Common examples of powder coatings include epoxy-series, acryl-series and polyester-series. Polyester-series powder coatings, particularly those which are hardened with isocyanate and mainly comprise polyester having a hydroxyl group at a terminal end, have been known to provide well-balanced coating films excellent in weatherability, corrosion resistance and mechanical strength.

Powder coatings have been widely used in various fields including appliance, automobile and construction materials. In some cases, a glossy coated surface (specular gloss at 60°: approximately 90 to 100%) is required for aesthetic purposes, while a matte (specular gloss at 60°: less than 30%) or semimatte (specular gloss at 60°: 30 to 70%) may be required for other purposes.

Examples of conventional methods for preparing such a matte or semimatte powder coating include a method comprising adding a large amount of a pigment comprised of coarse particles, and another method comprising dry-blending a polyester powder coating with an acryl powder coating as disclosed in JP-B-61-19668 (the term "JP-B" as used herein means an "examined published Japanese patent application").

However, the addition of a large amount of a pigment of coarse particles causes a deterioration in smoothness or a decrease in mechanical strength of the coating film. On the other hand, when using the method of dry-blending the two powder coatings, a matte or semimatte powder coating cannot be obtained by a single step, which increases production cost. Furthermore, this method suffers from other problems including heterogeneity of the resulting blend and a change in the blending ratio during recovery and application.

In order to solve the above-mentioned problems, JP-A-64-1770 (the term "JP-A" as used herein means an "unexamined published Japanese patent application") proposes a resin composition for a powder coating comprising a polyester having a hydroxyl value of at least 1,200 g eq/10$^6$ g, another polyester having a hydroxyl value of from 200 to 1,000 g eq/10$^6$ g and a hardener wherein the difference in gel time between the two polyesters is at least 3 minutes.

However, this resin composition for a powder coating is disadvantageous in that the specular gloss at 60° of a coated face varies within a range of from several percent to 50% when a completely matte coated surface of a specular gloss at 60° of 10% or less is to be formed. Therefore, a completely matte coated face having a stable specular gloss cannot be obtained from this resin composition.

SUMMARY OF THE INVENTION

An object of the present invention is to provide a resin composition for a matte powder coating whereby a stable coating film can be obtained even though a completely matte coated face is to be formed.

As a result of extensive studies, the present inventors have found that a resin composition for a matte powder coating capable of forming a stable matte or semimatte coating film can be obtained by blending specific polyester resins, thus attaining the above and other objects of the present invention.

Accordingly, the present invention provides a resin composition for a matte powder coating comprising a polyester A having a hydroxyl value of at least 1,200 g eq/10$^6$ g, a polyester B having a hydroxyl value of from 200 to 1,000 g eq/10$^6$ g, and a blocked isocyanate hardener, wherein the composition ratio (by weight) of polyester A to polyester B is from 70:30 to 10:90, the difference (absolute value) in gel time between polyester A and polyester B is at least 3 minutes and the difference (absolute value) in acid value between these polyesters is at least 20 g eq/10$^6$ g.

DETAILED DESCRIPTION OF THE INVENTION

In the resin composition of the present invention, the hydroxyl value of polyester A should be at least 1,200 g eq/10$^6$ g, preferably from 2,000 to 5,500 g eq/10$^6$ g, while that of polyester B should be from 200 to 1,000 g eq/10$^6$ g. When the hydroxyl value of the polyester A is less than 1,200 g eq/10$^6$ g, a good matting effect cannot be achieved. When the hydroxyl value of polyester B is less than 200 g eq/10$^6$ g, the surface of the coating film suffers from significant unevenness, and therefore the smoothness thereof is deteriorated. When the hydroxyl value of polyester B exceeds 1,000 g eq/10$^6$ g, on the other hand, the mechanical strength of the coating film is deteriorated or a poor matting effect is achieved.

Hydroxy values of polyesters may be controlled by adjusting the molar ratio of alcohol to acid in the production of polyester and/or adding the predetermined amount of alcohol to polyester to depolymerize it.

In the present invention, a blocked isocyanate hardener is to be used to improve the appearance and mechanical strength of the coating film. Preferable examples of the blocked isocyanate hardener include diisocyanate compounds such as isophorone diisocyanate, 2,4-toluene diisòcyanate, 4,4'-diphenylmethane diisocyanate, xylylene diisocyanate and hexamethylene diisocyanate, which are blocked with ε-caprolactam, δ-valerolactam, phenol, benzyl alcohol, etc. It is preferable to use the hardener at such a ratio that the amount of isocyanate groups of the hardener is almost equivalent (preferably 0.8 to 1.2 equivalents) with the amount of hydroxyl groups of the polyesters.

In the resin composition of the present invention, the composition ratio (by weight) of polyester A to polyester B is from 70:30 to 10:90, preferably from 40:60 to 20:80. When the composition ratio does not fall within the broader range, a satisfactory matting effect cannot be achieved.

In the resin composition of the present invention, the difference (absolute value) in the gel time between polyesters A and B should be at least 3 minutes. When this requirement is not satisfied, a sufficient matting effect cannot be achieved. In order to obtain a highly matte coated film (specular gloss at 60°: less than 20%), it is preferable that said difference is at least 5 minutes.

The term "gel time" as used herein means the value determined with the use of a Brabender Plasti-Corder by the method as will be described below, which is depending on the hydroxy value (e.g., gel time is lengthened by controlling hydroxy value low) and the glycol used in the synthesis of polyester.

In the present invention, the degree of matting can be controlled by adjusting the hydroxyl value of polyester A, the weight ratio of polyesters A and B, and the difference in gel time between these polyesters. When the hydroxyl value of polyester A is approximately 3,000 g eq/$10^6$ g or above and the weight ratio of polyester A to polyester B is 3:7, for example, a completely matte coated face (specular gloss at 60°: less than 10%), a matte coated face (specular gloss at 60°: approximately 20%) and a semimatte coated face (specular gloss at 60°:50 to 60%) may be obtained by adjusting the difference in gel time between these polyesters to at least 6 minutes, approximately 5 minutes and approximately 3 to 4 minutes, respectively.

In the present invention, it is further required to control the difference (absolute value) in acid value between polyesters A and B to at least 20 g eq/$10^6$ g. In order to obtain a stably highly matte coated face, the difference may be preferably controlled to at least 30 g eq/$10^6$ g. When the difference in acid value between these polyesters is less than 20 g eq/$10^6$ g, the specular gloss at 60° of a coated face varies within a range of from several percent to 50% when a completely matte coated surface of a specular gloss at 60° of 10% or less is to be formed, and therefore a matte coated face having a stable specular gloss cannot be obtained.

Generally, acid values of polyesters may be controlled by adding the predetermined amount of acid to polyester with high polymerization degree and little hydroxyl group to depolymerize it.

A polyester resin of a high acid value may be obtained, for example, by adding a carboxylic acid or a carboxylic anhydride having a valence of two or more to a polyester resin, which has been prepared previously, followed by performing a known esterification or addition reaction.

As the polyester A, those obtained from the following carboxylic acid components and alcohol components may be preferably employed.

Carboxylic Acid Component

Materials comprising terephthalic acid and/or isophthalic acid optionally together with other polyvalent carboxylic acids such as aromatic dicarboxylic acids (for example, 2, 6-naphthalenedicarboxylic acid), aliphatic dicarboxylic acids (for example, succinic acid, adipic acid, azelaic acid), alicyclic dicarboxylic acids (for example, cyclohexanedicarboxylic acid) and a small amount of tri- or higher valent carboxylic acids (for example, trimellitic acid, pyromellitic acid).

Alcohol Component

Materials comprising trimethylolpropane optionally together with other polyhydric alcohols such as aliphatic glycols (for example, ethylene glycol, diethylene glycol, 1, 2-propanediol, neopentyl glycol), alkylene oxide adducts of bisphenol S and tri- or higher hydric alcohols (for example, glycerol, pentaerythritol).

Furthermore, a small amount of oxycarboxylic acids (for example, p-oxybenzoic acid, tartaric acid) may be added.

As polyester B, those obtained from the following carboxylic acid components and alcohol components may be preferably employed.

Carboxylic Acid Component

Materials comprising terephthalic acid and/or isophthalic acid optionally together with other carboxylic acids such as aromatic dicarboxylic acids (for example, 2,6-naphthalenedicarboxylic acid), aliphatic dicarboxylic acids (for example, succinic acid, adipic acid, azelaic acid), alicyclic dicarboxylic acids (for example, cyclohexanedicarboxylic acid) and a small amount of tri- or higher valent carboxylic acids (for example, trimellitic acid, pyromellitic acid, and trimesic acid).

Alcoholic Component

Materials comprising ethylene glycol and neopentyl glycol optionally together with other alcohols such as aliphatic glycols (for example, diethylene glycol, 1,2-propanediol) and a small amount of tri- or higher hydric alcohols (for example, trimethylolethane, trimethylolpropane, glycerol, pentaerythritol).

Furthermore, a small amount of oxycarboxylic acids (for example, p-oxybenzoic acid, tartaric acid) may be added.

It is required that both polyesters A and B are polyesters which do not substantially set to gel. The expression "polyester which does not substantially set to gel" as used herein means a polyester which can be ground with the use of a common mill and is flowable when melted. When a polyester has set to gel, it is difficult to formulate the resin composition into a coating and, furthermore, the obtained coating film fails to give an even surface.

The average degrees of polymerization of the polyesters A and B may preferably be from 4 to 50, since such a polyester can be easily powdered.

Furthermore, the softening points of the polyesters A and B may preferably be from 50° to 150° C. When the softening point of a polyester is lower than 50° C., the powdered resin is liable to be solidified through aggregation, and thus the blocking resistance of the coating is deteriorated. When the softening point exceeds 150° C., on the other hand, it is necessary to employ an elevated kneading temperature. As a result, the reaction of the resin composition with the hardener would proceed during the formulation of the coating, and therefore the smoothness and mechanical strength of the obtained coating film are deteriorated.

The resin composition for the matte powder coating of the present invention may be produced by kneading the above-mentioned polyesters A and B and the blocked isocyanate hardener by using a kneader or a roller at a temperature of from 70° to 150° C.

The resin composition of the present invention may further contain other additives (for example, hardening catalysts, leveling agents), if required.

The gloss of a typical coating film of a powder coating is affected by the state of the blended resin composition, hardener, pigment and other additives. For example, the gloss would vary depending on a shift in temperature during melting and kneading in a Ko-kneader (manufactured by Buss Co.), the application of shear and a change in molten viscosity of the resin.

It is believed, however, that the coating film formed by using the resin composition of the present invention, which exerts a sufficient matting effect, would show little variation in gloss even with considerable changes in the melting and kneading conditions.

To further illustrate the present invention, the following Examples and Comparative Examples will be given. These examples are merely illustrative and are not to be understood as limiting the scope and underlying principles of the invention in any way.

The characteristic data was determined by the following methods.

Average Degree of Polymerization

Determined by gel permeation chromatography.

Hydroxyl Value

Determined by acetylating a sample and then titrating with a solution of potassium hydroxide in methanol.

Acid Value

Determined by dissolving a sample in dioxane and then titrating with a solution of potassium hydroxide in methanol.

Softening Point

Determined by heating a sample on a hot bench and then observing with the naked eye.

Gel Time

To a polyester composition, there were added a blocked isocyanate hardener (B-1530 manufactured by Hüls Co.), in such an amount as to give an NCO (isocyanate) value equivalent with the hydroxyl value of the polyester composition, and 33% by weight of a titanium oxide powder. Then the hardening curve of 90 g of the obtained sample was formed by using a Brabender Plasti-Corder (manufactured by Brabender Co.) at a temperature of 200° C. The time to inflection point is referred to herein as the "gel time".

Specular Gloss at 60°

Determined in accordance with JIS K 5400.

Smoothness

The smoothness of a coating film was evaluated by observing with the naked eye.

Impact Resistance

In accordance with JIS K 5400, determined by using a ball (diameter: ½ in., weight: 500 g).

Pencil Hardness

Determined in accordance with JIS K 5400.

Accelerated Weatherability

Determined in accordance with JIS K 5400.

REFERENCE EXAMPLE 1

Preparation of Polyester A

The compounds as specified in Table 1 were introduced into a stainless reaction vessel provided with stirring blades and heated to 230° C. under stirring. The water thus formed was continuously removed from the reaction system. After keeping the reaction mixture under the reduced pressure of 600 mmHg for 3 hours, the compound as specified in Table 2 was added thereto. The mixture was stirred under atmospheric pressure for 1 hour to thereby obtain polyester resin 1.

REFERENCE EXAMPLES 2 AND 3

Preparation of Polyester A

The compounds as specified in Table 1 were introduced into a stainless reaction vessel provided with stirring blades and heated to 230° C. under stirring. The water thus formed was continuously removed from the reaction system. After keeping the reaction mixture under reduced pressure of 600 mmHg for 3 hours, polyester resins 2 and 3 were obtained.

REFERENCE EXAMPLES 4 TO 7

Preparation of Polyester B

The compounds as specified in Table 1 were introduced into a stainless reaction vessel provided with stirring blades and heated to 260° C. under stirring. The water thus formed was continuously removed from the reaction system. Next, 5.84 parts by weight of antimony trioxide were added thereto as a catalyst. Then the obtained mixture was subjected to a polycondensation reaction at 280° C. for 4 hours under reduced pressure of 0.5 mmHg or below to thereby obtain a polyester resin having a high degree of polymerization. The compound as specified in Table 2 was added to the obtained resin at 270° C. After depolymerizing in a closed system, polyester resins 4 to 7 were obtained.

Table 3 shows the characteristic data of each polyester resin.

EXAMPLES 1 TO 5 AND COMPARATIVE EXAMPLES 1 TO 4

Each polyester resin as specified in Table 4, an isophorone diisocyanate blocked with ε-caprolactam (B-1530 manufactured by Hüls Co.), a leveling agent (Acronal 4F manufactured by BASF Co.), benzoin and titanium oxide were dry-blended at the ratio specified in Table 4 in a Henschel mixer (FM20B manufactured by Mitsui Miike Seisakusho K. K.) and then kneaded in a molten state in a Ko-kneader (PR-46 manufactured by Buss Co.) at a temperature of 100° to 130° C. After cooling and grinding, the product was passed through a wire mesh (140 mesh) to thereby obtain a powder coating.

The obtained powder coating was electrostatically applied onto a steel plate treated with zinc phosphate in such a manner as to provide a film thickness of 50 to 60 μ followed by baking at 200° C. for 20 minutes.

Table 5 shows the results of the evaluation of the film properties as well as the difference in gel time and the difference in acid value between the polyesters A and B.

EXAMPLE 6 AND COMPARATIVE EXAMPLE 5

Five batch portions of powder coatings of the same compositions as those of Example 5 and Comparative Example 4 were produced and the film properties were evaluated.

The specular glosses at 60° (%) of these products were as follows. When the specular glosses are completed among five samples, the powder coating should be valued to provide a stable coated face.

EXAMPLE 6

(The Same Composition as that of Example 5)

| | | | | |
|---|---|---|---|---|
| 9.6 | 9.0 | 9.3 | 7.6 | 8.8 |

COMPARATIVE EXAMPLE 5

(The Same Composition as that of Comparative Example 4)

| | | | | |
|---|---|---|---|---|
| 11.0 | 26.7 | 35.5 | 30.8 | 48.9 |

TABLE 1

| Reference Example | 1 | 2 | 3 | 4 | 5 | 6 | 7 |
|---|---|---|---|---|---|---|---|
| terephthalic acid | 3320 | 3320 | | 16600 | 16600 | 16600 | 11620 |
| isophthalic acid | 13280 | 13280 | 17000 | | | | 4980 |
| ethylene glycol | | | | 3100 | 3720 | 5890 | 9920 |
| neopentyl glycol | 520 | 520 | | 11440 | 10400 | 6760 | |
| bisphenol S ethylene oxide | | | 3380 | | | | |
| trimethylolpropane | 15810 | 15810 | 15410 | | | | |

TABLE 2

(part by weight)

| Reference Example | 1 | 4 | 5 | 6 | 7 |
|---|---|---|---|---|---|
| isophthalic acid | 230 | | | | |
| neopentyl glycol | | | 100 | | |
| trimethylol propane | | 540 | 670 | 540 | 550 |

TABLE 3

(part by weight)

| Polyester Resin | 1 | 2 | 3 | 4 | 5 | 6 | 7 |
|---|---|---|---|---|---|---|---|
| average degree of polymerization | 4.6 | 4.9 | 5.2 | 25.3 | 16.2 | 25.5 | 24.8 |
| hydroxyl value (g eq/10$^6$ g) | 4810 | 4870 | 4370 | 500 | 730 | 540 | 630 |
| acid value (g eq/10$^6$ g) | 64 | 11 | 43 | 9 | 10 | 10 | 11 |
| softening point (°C.) | 70 | 73 | 78 | 89 | 80 | 85 | 80 |
| gel time (min.) | 4.4 | 4.3 | 4.4 | 12.8 | 10.2 | 9.0 | 7.4 |

TABLE 4

(part by weight)

| | Example | | | | | Comp. Ex. | | | |
|---|---|---|---|---|---|---|---|---|---|
| | 1 | 2 | 3 | 4 | 5 | 1 | 2 | 3 | 4 |
| polyester resin | | | | | | | | | |
| 1 | 200 | | | | | | | 404 | |
| 2 | | | | | | 173 | 285 | | 193 |
| 3 | | 177 | 204 | 201 | 199 | | | | |
| 4 | 466 | 532 | | | | 519 | 285 | 45 | |
| 5 | | | | | 464 | | | | 451 |
| 6 | | 475 | | | | | | | |
| 7 | | | | 470 | | | | | |
| hardener | 334 | 291 | 321 | 329 | 337 | 308 | 430 | 551 | 356 |
| leveling agent | 10 | 10 | 10 | 10 | 10 | 10 | 10 | 10 | 10 |
| benzoin | 5 | 5 | 5 | 5 | 5 | 5 | 5 | 5 | 5 |
| titanium oxide | 500 | 500 | 500 | 500 | 500 | 500 | 500 | 500 | 500 |

TABLE 5

| | Example | | | | | Comp. Ex. | | | |
|---|---|---|---|---|---|---|---|---|---|
| | 1 | 2 | 3 | 4 | 5 | 1 | 2 | 3 | 4 |
| difference in gel time (min.) | 8.4 | 8.4 | 4.6 | 3.0 | 5.8 | 8.5 | 8.5 | 8.4 | 5.9 |
| difference in acid value (g eg/10$^6$ g) | 55 | 34 | 33 | 32 | 33 | 2 | 2 | 55 | 1 |
| specular gloss at 60° C. (%) | 4.8 | 5.7 | 25.0 | 60.3 | 9.6 | 35.2 | 76.2 | 87.0 | 11.0 |
| smoothness | good | ← | ← | ← | ← | ← | ← | ← | ← |
| impact resistance (cm) | >50 | >50 | >50 | 40 | 40 | >50 | 20 | <20 | 40 |
| pencil hardness | 2H | H | 2H | 2H | 2H | H | 2H | 2H | 2H |
| accelerated weatherability | no abnormality | ← | ← | ← | ← | ← | ← | ← | ← |

According to the present invention, a resin composition for a matte powder coating capable of providing a stable coated face over a wide range of from semimatte to completely matte coated faces can be obtained.

While the invention has been described in detail and with reference to specific examples thereof, it will be apparent to one skilled in the art that various changes and modifications can be made therein without departing from the spirit and scope thereof.

What is claimed is:

1. A resin composition for a matte powder coating comprising a polyester A having a hydroxyl value of at least 1,200 g eq/10$^6$ g, a polyester B having a hydroxyl value of from 200 to 1,000 g eq/10$^6$ g, and a blocked isocyanate hardener, wherein the weight ratio of said polyester A to said polyester B is from 70:30 to 10:90; the difference (absolute value) in gel time between polyester A and polyester B is at least 3 minutes and the difference (absolute value) in acid value between these polyesters is at least 30 g eq/10$^6$ g.

2. A resin composition as in claim 1, wherein said polyester A is a polyester comprising terephthalic acid and/or isophthalic acid and trimethylolpropane, and said polyester B is a polyester comprising terephthalic acid and/or isophthalic acid and ethylene glycol and/or neopentyl glycol.

3. A resin composition as in claim 1, wherein the ratio by weight of said polyester A to said polyester B is from 40:60 to 20:80.

4. A resin composition as in claim 1, wherein the hydroxyl value of the polyester A is from 2,000 to 5,500 g eq/$10^6$ g.

5. A resin composition as in claim 1, wherein the difference (absolute value) in gel time between the polyester A and polyester B is at least 5 minutes.

6. A resin composition as in claim 1, wherein the softening points of the polyesters A and B is from 50° to 150° C.

* * * * *